United States Patent
Winberg et al.

(10) Patent No.: US 8,070,367 B2
(45) Date of Patent: Dec. 6, 2011

(54) FIELD TERMINABLE LC FORMAT OPTICAL CONNECTOR WITH SPLICE ELEMENT

(75) Inventors: Paul N. Winberg, Rollingwood, TX (US); Donald K. Larson, Cedar Park, TX (US); Wesley A. Raider, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 324 days.

(21) Appl. No.: 12/428,729

(22) Filed: Apr. 23, 2009

(65) Prior Publication Data

US 2009/0269014 A1  Oct. 29, 2009

Related U.S. Application Data

(60) Provisional application No. 61/047,868, filed on Apr. 25, 2008.

(51) Int. Cl.
*G02B 6/36* (2006.01)
*G02B 6/38* (2006.01)
*G02B 6/255* (2006.01)

(52) U.S. Cl. ............ 385/81; 385/55; 385/56; 385/58; 385/60; 385/62; 385/66; 385/68; 385/69; 385/70; 385/72; 385/75; 385/76; 385/77; 385/78; 385/84; 385/95; 385/99

(58) Field of Classification Search ............ 385/60, 385/62, 72, 78, 81, 95
See application file for complete search history.

(56) References Cited

U.S. PATENT DOCUMENTS

| | | | |
|---|---|---|---|
| 4,824,197 | A | 4/1989 | Patterson |
| 5,102,212 | A | 4/1992 | Patterson |
| 5,138,681 | A | 8/1992 | Larson et al. |
| 5,155,787 | A | 10/1992 | Carpenter et al. |
| 5,159,653 | A | 10/1992 | Carpenter et al. |
| 5,461,690 | A | 10/1995 | Lampert |

(Continued)

FOREIGN PATENT DOCUMENTS

JP 3445479 6/2003

(Continued)

OTHER PUBLICATIONS

Form PCT/ISA/210, dated Dec. 3, 2009, issued in PCT/US2009/041501.

(Continued)

*Primary Examiner* — Ryan Lepisto
(74) *Attorney, Agent, or Firm* — Gregg H. Rosenblatt

(57) ABSTRACT

An LC format optical connector for terminating an optical fiber includes a housing configured to mate with an LC receptacle, the housing including a shell, a first resilient latch disposed on a surface of the shell, and a backbone. The LC format connector also includes a collar body disposed in the housing and retained between the outer shell and the backbone, wherein the collar body includes a fiber stub disposed in a first portion of the collar body. The collar body further includes a mechanical splice disposed in a second portion of the collar body, the mechanical splice configured to splice the second end of the fiber stub to a second optical fiber. The LC format connector further includes a trigger coupled to an outer surface of the housing backbone, the trigger including a second latch that engages the first latch when acted upon by a pressing force. An optical connector with a single piece latch structure is also provided.

16 Claims, 9 Drawing Sheets

U.S. PATENT DOCUMENTS

| | | | |
|---|---|---|---|
| 5,481,634 A | | 1/1996 | Anderson et al. |
| 5,579,425 A | * | 11/1996 | Lampert et al. .................. 385/59 |
| 5,638,474 A | | 6/1997 | Lampert et al. |
| 5,647,043 A | | 7/1997 | Anderson et al. |
| 5,719,977 A | | 2/1998 | Lampert et al. |
| 6,019,521 A | | 2/2000 | Manning et al. |
| D434,376 S | | 11/2000 | Connelly |
| 6,206,581 B1 | | 3/2001 | Driscoll et al. |
| D446,501 S | | 8/2001 | Donnell et al. |
| 6,287,018 B1 | | 9/2001 | Andrews et al. |
| 6,302,596 B1 | * | 10/2001 | Cohen et al. ..................... 385/93 |
| 6,357,934 B1 | | 3/2002 | Driscoll et al. |
| 6,364,685 B1 | * | 4/2002 | Manning ........................ 439/357 |
| D466,479 S | | 12/2002 | Pein et al. |
| 6,565,262 B2 | | 5/2003 | Childers et al. |
| D481,680 S | | 11/2003 | Cheng et al. |
| 6,816,661 B1 | | 11/2004 | Barnes et al. |
| 6,821,024 B2 | | 11/2004 | Bates, III |
| D523,396 S | | 6/2006 | Shiraishi et al. |
| D528,505 S | | 9/2006 | Caveney et al. |
| 7,104,702 B2 | | 9/2006 | Barnes et al. |
| 7,147,384 B2 | | 12/2006 | Hardcastle et al. |
| 7,189,008 B2 | | 3/2007 | Dye |
| 2001/0043777 A1 | | 11/2001 | Lu |
| 2003/0063865 A1 | | 4/2003 | Holmquist |
| 2005/0213892 A1 | * | 9/2005 | Barnes et al. ..................... 385/62 |
| 2005/0238292 A1 | | 10/2005 | Barnes et al. |
| 2007/0104425 A1 | | 5/2007 | Larson et al. |
| 2007/0133926 A1 | | 6/2007 | Semmler et al. |
| 2008/0248682 A1 | | 10/2008 | Larkin |

FOREIGN PATENT DOCUMENTS

| | | |
|---|---|---|
| WO | 2006/019515 A1 | 2/2006 |
| WO | 2006/019516 A1 | 2/2006 |

OTHER PUBLICATIONS

U.S. Appl. No. 61/171,908, filed Apr. 23, 2009, entitled "Collar Body for Field Terminable Optical Connector".

Product Brochure, "LC System Solution"; Panduit Corporation, Tinley Park, IL (Jun. 2004).

Product Specification, "Fast Connectors"; Optical Connectivity, AFL Telecommunications (Revision 3, Aug. 2006).

Product Brochure, "UniCam® Single-Mode APC Connectors (LC and SC Connectors)"; Corning Cable Systems LLC, Hickory, NC (Apr. 2007).

Product Brochure, "UniCam® Pretium®-Performance Single-Mode Connectors LC, SC, ST® Compatible"; Corning Cable Systems LLC, Hickory, NC (Apr. 2007).

Product Brochure, "UniCam® Pretium®-Performance Multi-Mode Connectors LC, SC, ST® Compatible"; Corning Cable Systems LLC, Hickory, NC (May 2007).

Product Brochure, "Opti-Snap™ SC APC, LC Compatible Single-Mode Field-Installable Connector"; Corning Cable Systems LLC, Hickory, NC (Jul. 2007).

* cited by examiner

FIELD TERMINABLE LC FORMAT OPTICAL CONNECTOR WITH SPLICE ELEMENT

CROSS-REFERENCE TO RELATED APPLICATION

This application claims the benefit of U.S. Provisional Patent Application No. 61/047,868, filed Apr. 25, 2008, the disclosure of which is incorporated by reference herein in its entirety.

BACKGROUND OF THE INVENTION

1. Field of the Invention

The present invention is directed to an optical connector.

2. Related Art

Mechanical optical fiber connectors for the telecommunications industry are known. For example, LC, ST, FC, and SC optical connectors are widely used.

LC connectors were developed by Lucent as a small-form-factor optical connector in the early 1990s. These connectors have a size that is approximately one-half scale as compared to other standard connector formats. This smaller size permits higher packing densities in distribution frames, resulting in cost savings in the central office and data centers that used them.

The original LC connectors were made by inserting a bare fiber into a hollow ferrule and bonding the fiber into the ferrule with, typically, an epoxy-based adhesive. Conventional LC connector structures and fabrication information are described in U.S. Pat. Nos. 5,461,690; 5,579,425; 5,638,474; 5,647,043; 5,481,634; 5,719,977, and 6,206,581.

More recently, an LC connector has been developed that uses a hot-melt adhesive instead of an epoxy-based adhesive, as is described in U.S. Pat. No. 7,147,384.

Conventional LC connectors can require a multi-step polishing procedure that must be carefully performed in a controlled manner to achieve a high degree of polish on the end of the fiber and ferrule, while maintaining the proper spherical radius on the end of the ferrule, and while retaining a proper ferrule length. The amount of care needed for this connector preparation is further increased when the connector is an APC (angle polish connector) type.

With these types of requirements, these conventional connectors are not well suited for field installations. As mentioned above, an adhesive is required to mount standard LC connectors to an optical fiber. This process can be awkward and time consuming to perform in the field. Also, post-assembly polishing requires that the craftsman have a higher degree of skill.

Also known are hybrid optical splice connectors, as described in JP Patent No. 3445479, JP Application No. 2004-210251 (WO 2006/019516) and JP Application No. 2004-210357 (WO 2006/019515). However, these hybrid splice connectors are not compatible with standard connector formats and require significant piecewise assembly of the connector in the field. The handling and orientation of multiple small pieces of the connector can result in incorrect connector assembly that may either result in decreased performance or increase the chance of damaging the fiber.

More recently, US Publication No. 2007/0104425 A1 describes an optical fiber connector that includes a pre-polished fiber stub disposed in ferrule that is spliced to a field fiber with a mechanical splice. Such a connector, called an NPC, is now commercially available through 3M Company. Small form factor connectors that are available include the Pretium LC (available from Corning), the Fast LC (available from Fujikura), the Opticam LC (available from Panduit), and Lightcrimp LC (available from Tyco).

SUMMARY OF THE INVENTION

According to a first aspect of the present invention, an LC format optical connector for terminating an optical fiber is provided. The LC format connector includes a housing configured to mate with an LC receptacle, the housing including a shell having an LC format and a front face, a first resilient latch disposed on a surface of the shell and configured to engage the LC receptacle, the first resilient latch extending away from the front face, and a backbone configured to engage an outer surface of the shell on a first portion thereof and having a mounting structure disposed on a second portion thereof. The LC format connector also includes a collar body disposed in the housing and retained between the outer shell and the backbone, wherein the collar body includes a fiber stub disposed in a first portion of the collar body, the fiber stub including a first optical fiber mounted in a ferrule and having a first end proximate to an end face of the ferrule and a second end. The collar body further includes a mechanical splice disposed in a second portion of the collar body, the mechanical splice configured to splice the second end of the fiber stub to a second optical fiber. The LC format connector further includes a trigger coupled to an outer surface of the housing backbone, the trigger including a second latch that extends toward the front face, wherein a portion of the second latch overlaps a portion of the first latch, wherein the second latch engages the first latch when acted upon by a pressing force.

In one aspect, the LC format optical connector of claim 1 further comprises a fiber boot coupled to an end of the housing to restrict a lateral motion of the second optical fiber, the fiber boot having a first portion thereof disposed between the backbone and the trigger.

In another aspect, the trigger further comprises an integral coupling mechanism to couple the LC format optical connector to a second LC format optical connector. In one aspect, the coupling mechanism comprises a dovetail protrusion formed on a first side surface of the trigger and a corresponding slot formed on an opposite side surface of the trigger, wherein the slot is configured to slidingly and snugly engage a dovetail portion of the trigger of the second LC format optical connector.

In another aspect, the LC format optical connector includes cable identification labels formed on opposite outer sides of the backbone.

In another aspect, the second latch includes a driver that overlaps a portion of the first latch, the driver configured to receive a pressing force from a finger. In one aspect, the driver of the trigger latch includes an underhanging lip portion extending from a first side of the driver and an overhanging lip portion extending from an opposite side of the driver.

In another aspect, the LC format optical connector further comprises a buffer clamp configured within a third portion of the collar body, the buffer clamp configured to clamp at least a portion of a buffer cladding of the second fiber upon actuation, and a buffer clamp actuation sleeve configured to be received on an outer surface of the third portion of the collar body and configured to slidably actuate the buffer clamp.

In another aspect, the first latch and the second latch are formed as a single, integral latch structure coupling the shell to the trigger.

In another aspect, a multiple set LC format optical connector is provided, where the multiple set LC format optical connector includes the LC format optical connector described above and at least a second LC format connector. The second LC format optical connector includes a second housing, a second collar body and a second trigger, wherein the second trigger includes a second coupling mechanism that includes a dovetail protrusion and a corresponding slot, wherein the dovetail protrusion of the second LC connector engages the corresponding slot of the first LC format optical connector.

In one aspect, the multiple set LC format optical connector is a duplex LC format optical connector.

In another aspect of the invention, an LC format optical connector for terminating an optical fiber comprises a housing including an outer shell with an LC format and a front face configured to mate with an LC receptacle. A resilient latch is disposed on a surface of the outer shell and configured to engage the LC receptacle, wherein the resilient latch is a single-piece latch having a driver formed thereon that is configured to receive a pressing force that disengages the latch from an LC receptacle. The housing further includes a backbone configured to engage an outer surface of the outer shell on a first portion thereof and that includes a mounting structure disposed on a second portion thereof that is configured to engage a boot. The optical connector further comprises a collar body disposed in the housing and retained between the outer shell and the backbone, wherein the collar body includes a fiber stub disposed in a first portion of the collar body. The fiber stub includes a first optical fiber mounted in a ferrule and has a first end proximate to an end face of the ferrule and a second end. The collar body further includes a mechanical splice disposed in a second portion of the collar body, the mechanical splice configured to splice the second end of the fiber stub to a second optical fiber.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein.

Figure 1:
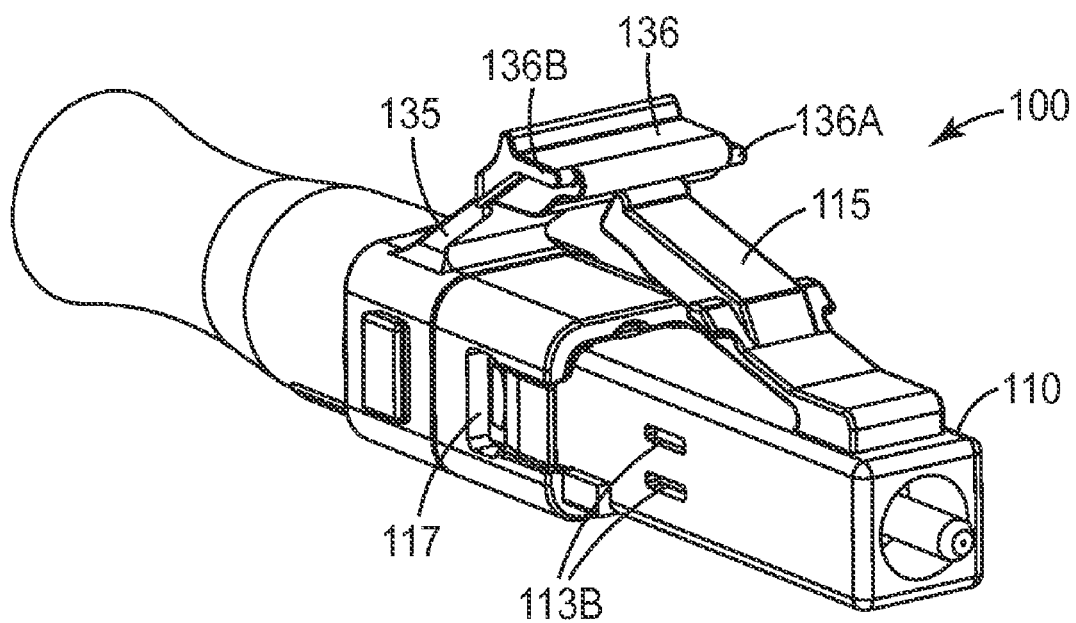
FIG. 1 is an isometric view of an optical connector according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention.

The present invention is directed to an optical connector. In particular, the optical connector of the exemplary embodiments is an LC-format optical connector of compact length that is capable of straightforward field termination. The exemplary connector described herein can be readily installed and utilized for Fiber To The Home (FTTH) and/or Fiber To The X (FTTX) network installations. The exemplary connector can be utilized in installation environments that require ease of use when handling multiple connections, especially where labor costs are more expensive.

Figure 2:
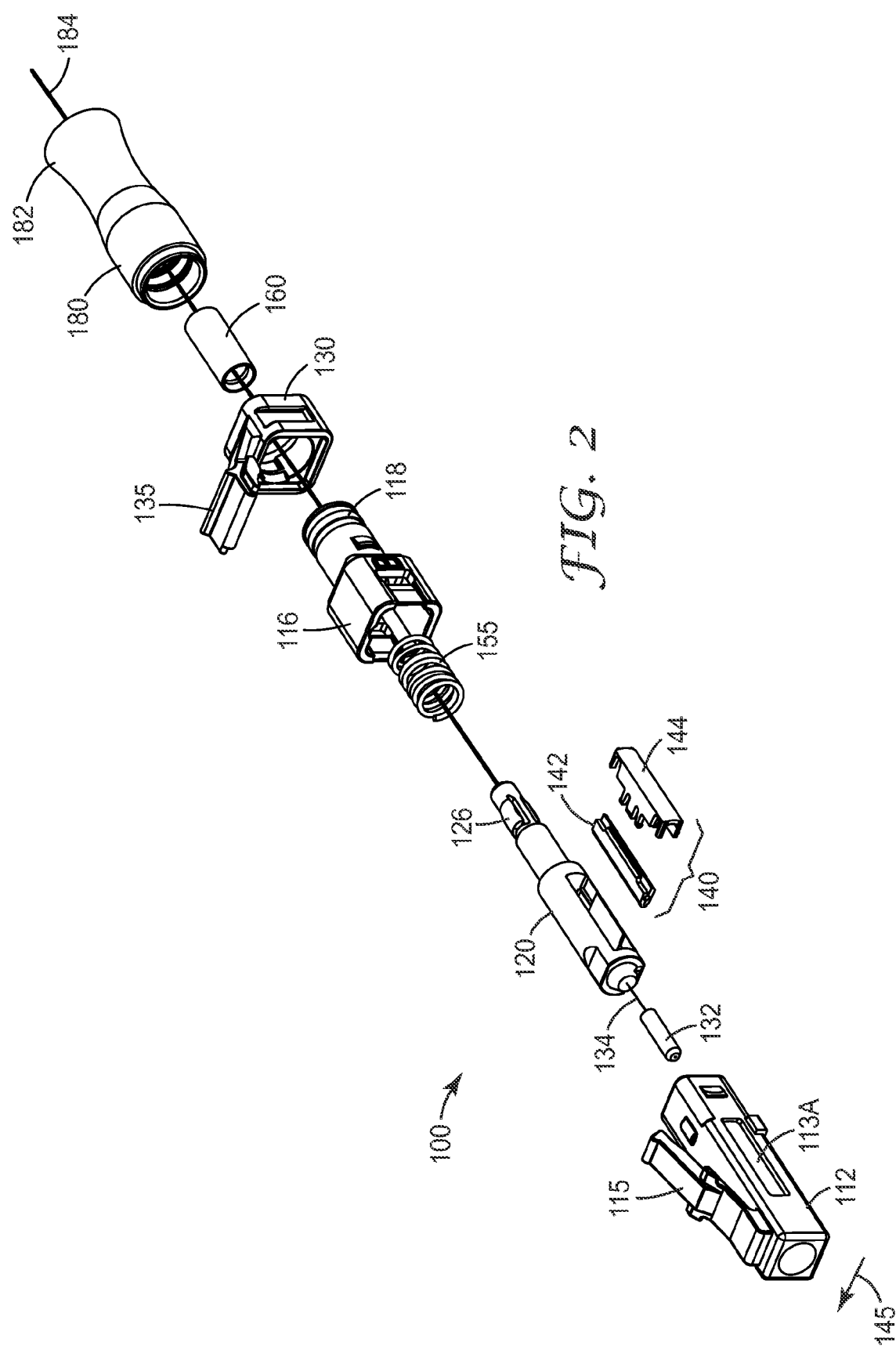
FIG. 2 is an exploded view of an optical connector according to an embodiment of the present invention.

According to an exemplary embodiment of the present invention, an optical fiber connector 100 is shown in isometric view in FIG. 1 and in exploded view in FIG. 2. FIGS. 3-7 show other views of connector 100 or components thereof. Optical connector 100 is configured to mate with an LC receptacle. LC-type optical fiber connector 100 can include a connector body having a housing 110 and a fiber boot 180. In this exemplary embodiment, housing 110 includes an outer shell 112, having a front face that is configured to be received in an LC receptacle (e.g., an LC coupling, an LC adapter, or an LC socket), and a clip 116 (also referred to as a "backbone") that provides further structural support and closes off the end of the connector to contain the ferrule 132, collar body 120, and spring 155 of the connector.

Figure 3:
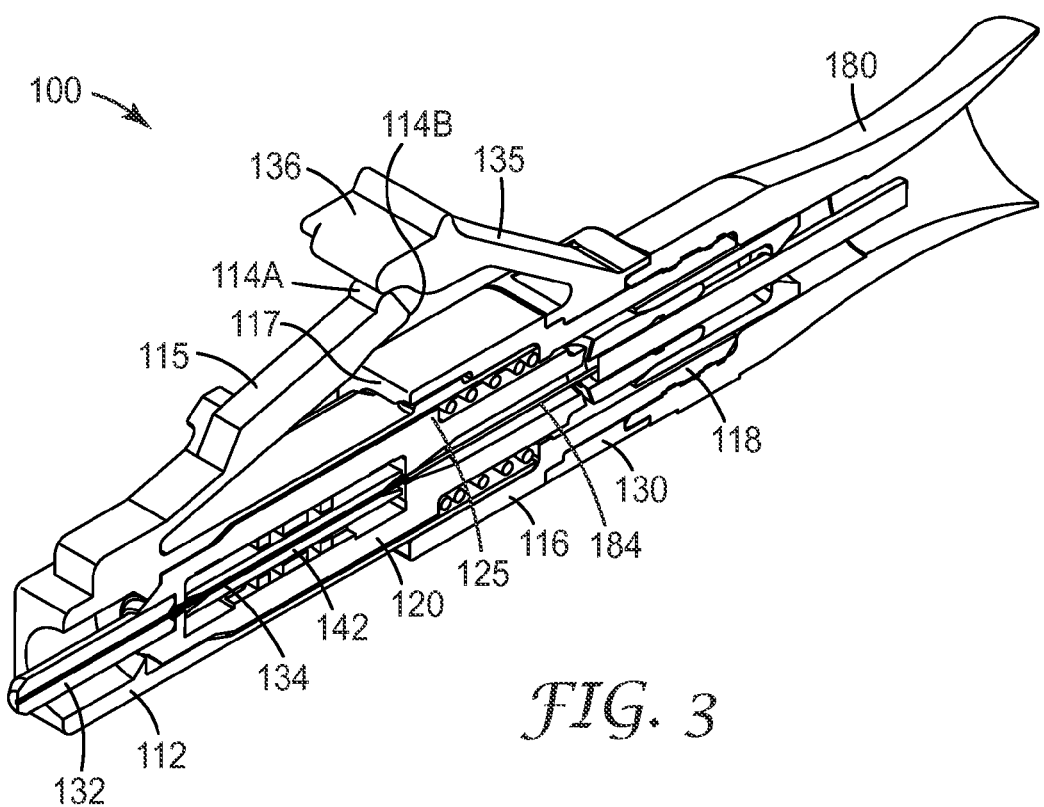
FIG. 3 is an isometric view of the exemplary optical connector of FIG. 2.

Shell 112 has an outer LC-shaped body format. In addition, housing 110 includes a latch 115 disposed on an outer surface of shell 112 that is configured to engage an LC receptacle and secure the connector 100 in place. The latch 115 is depressable and has sufficient flexibility so that the connector can be disengaged/released from the LC receptacle when the latch is activated with a modest pressing force. In addition, as shown in FIG. 3, the latch 115 extends rearward (i.e., away from the front face 102). Latch 115 has a rear edge lower portion 114B that is configured to contact an upper surface 117 of clip 116 when the latch is depressed. This structure creates a latch stop and prevents over-bending and over-stressing of the latch 115 as it may be repeatedly depressed when in use.

Housing 110 also includes an opening 113A formed on a side of the shell 112 of sufficient size to allow for access to a mechanical splice 140 disposed therein (see further discussion below). Also, in one aspect, one or more access slots 113B can be provided in shell 112 opposite opening 113A to allow access to the mechanical splice from the opposite side.

Clip 116 is shaped to engage with shell 112 by a sliding or snap fit over an outer surface of a rear portion of shell 112. A shoulder portion formed on the interior surface of clip 116 (see FIG. 3) provides a reaction face for the spring 155 to seat against. Clip or backbone 116 can further include a robust mounting structure 118 disposed on a rear portion of the clip that provides for coupling to a crimp ring, a fastener, or a fiber boot 180, which can be utilized to protect the optical fiber from bend related stress losses. As shown in FIG. 3, fiber boot 180 is coupled to the mounting structure 118 disposed on the rear portion of the clip 116. In an alternative aspect, for example when using a jacketed optical fiber cable that includes one or more strength members, a crimp ring can be utilized to anchor the cable jacket strength members to the clip 116.

According to an exemplary embodiment of the present invention, shell 112 and clip 116 can be formed or molded from a polymer material, although metal and other suitably rigid materials can also be utilized. In a preferred aspect, the outer shell 112 is formed from a more flexible or pliant material than the clip 116.

Connector 100 further includes a collar body 120 that is disposed within the connector housing and retained therein. According to exemplary embodiments, the collar body 120 (a collar body element may also be referred to as a "barrel") is a multi-purpose element that can house a fiber stub assembly, a mechanical splice 140, and a fiber buffer clamp 126. The collar body is configured to have some limited axial movement within clip 116. For example, the collar body 120 can include a collar or shoulder 125 (see FIG. 3) that can be used as a flange to provide resistance against spring 155, interposed between the collar body and the clip 116, when the fiber stub assembly is inserted in a receptacle. According to an exemplary embodiment of the present invention, collar body 120 can be formed or molded from a polymer material, although metal and other suitable materials can also be utilized. For example, collar body 120 can comprise an injection-molded, integral material. The collar body 120 is secured within housing 110 by clip portion 116, as is shown in cross section view in FIG. 3.

In particular, collar body 120 includes a first end portion 121 (See FIG. 6) having an opening to receive and house a fiber stub assembly, which includes a ferrule 132 having an optical fiber 134 secured therein. As is shown in FIG. 3, collar body 120 also includes a fiber guide channel that guides a field fiber 184 towards the ferrule. Collar body 120 can further include a keyed or flattened surface portion or portions 127 to ensure proper alignment within the connector housing as the collar body moves within the housing during use. This rotational alignment can be further advantageous when utilizing a factory-polished angle-polished connector (APC) ferrule. Alternatively, both the ferrule and collar body can include corresponding keying features to maintain rotational alignment.

Ferrule 132 can be formed from a ceramic, glass, plastic, or metal material to support the optical fiber 134 inserted and secured therein. In a preferred aspect, ferrule 132 is a ceramic ferrule. An optical fiber 134 is inserted through the ferrule 132, such that a first fiber stub end slightly protrudes from or is coincident or coplanar with the end face of ferrule 132. Preferably, this first fiber stub end is polished in the factory (e.g., a flat or angle-polish, with or without bevels). A second end of the fiber 134 extends part-way into the interior of the connector 100 and is utilized to splice a second optical fiber, such as field fiber 184. Preferably, the second end of fiber 134 can be cleaved (flat or angled, with or without bevels). In one aspect, the second end of fiber 134 can be polished in the factory to reduce the sharpness of the edge of the fiber, which can create scrapings (debris) as it is installed in the splice element. For example, an electrical arc, such as one provided by a conventional fusion splicer machine, can be utilized to melt the tip of the fiber and form a rounded end, thereby removing the sharp edges. This electrical arc technique can be used in conjunction with polishing by an abrasive material to better control end face shape while reducing possible distortion of the core. An alternative non-contact method utilizes laser energy to ablate/melt the tip of the fiber.

The stub and field fibers can comprise standard single mode or multimode optical fiber, such as SMF 28 (available from Corning Inc.). In an alternative embodiment, fiber 134 additionally includes a carbon coating disposed on the outer clad of the fiber to further protect the glass-based fiber. In an exemplary aspect, fiber 134 is pre-installed and secured (e.g., by epoxy or other adhesive) in the ferrule 132, which is disposed in the first end portion 121 of collar body 120. Ferrule 132 is preferably secured within collar body portion 121 via an epoxy or other suitable adhesive. Preferably, pre-installation of the fiber stub can be performed in the factory.

Figure 6:
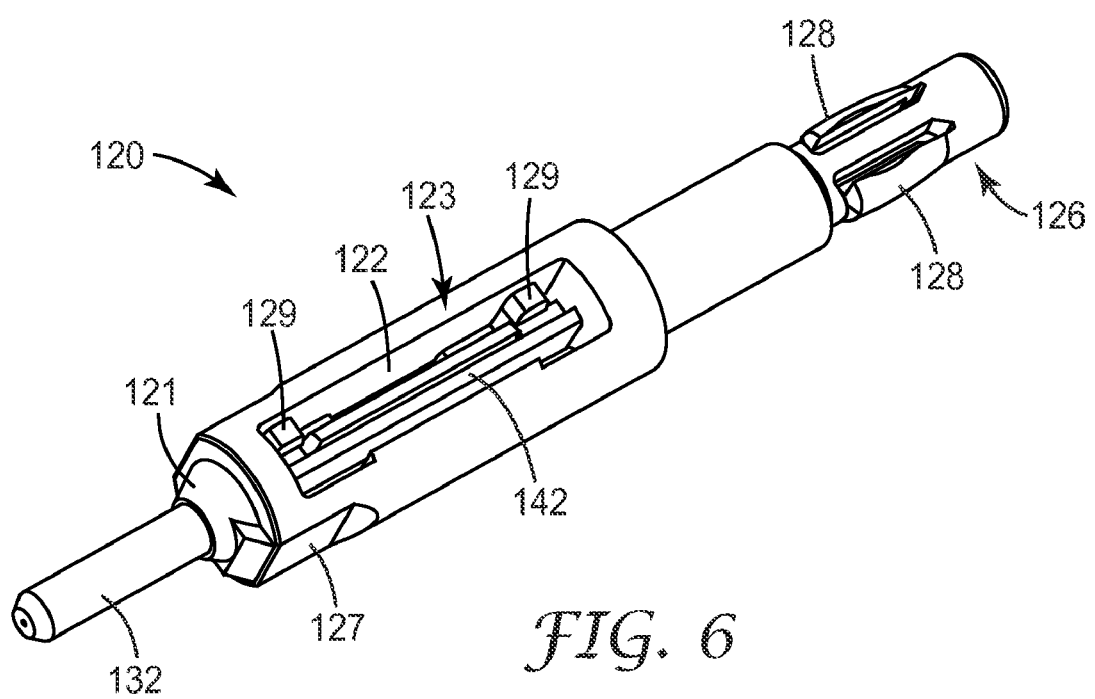
FIG. 6 is an isometric view of an exemplary collar body according to an embodiment of the present invention.
Figure 7:
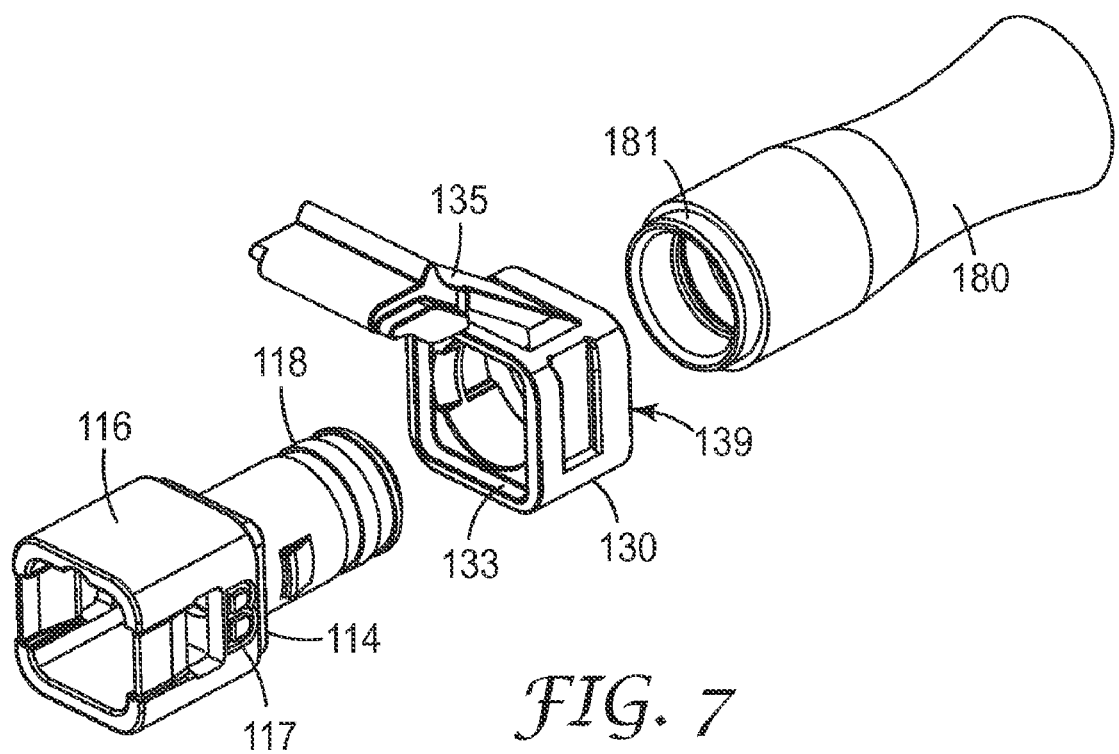
FIG. 7 is an exploded view of the clip-trigger-boot portion of an exemplary optical connector according to an embodiment of the present invention.

As shown in FIG. 6, collar body 120 further includes a splice element housing portion 123. In this exemplary aspect, splice element housing portion 123 provides an opening 122 in which a mechanical splice 140 can be inserted and secured in the central cavity of collar body 120. In an exemplary embodiment, mechanical splice 140 comprises a mechanical splice device (also referred to herein as a splice device or splice) that is similar in structure to a 3M™ FIBRLOK™ mechanical fiber optic splice device, available from 3M Company, of Saint Paul, Minn. In this exemplary aspect, the mechanical splice 140, which includes a splice element 142 and an actuating cap 144, is configured to be smaller than the conventional mechanical fiber optic splice device, owing to the reduced form factor of the LC connector (as compared, e.g., to a conventional SC connector format).

For example, splice element 142 is formed from a sheet of ductile material having a focus hinge that couples two legs about a fiber axis, where each of the legs includes a fiber gripping channel (e.g., a V-type (or similar) groove) to optimize clamping forces for conventional glass optical fibers received therein. The ductile material, for example, can be aluminum or anodized aluminum. In one aspect, a conventional index matching fluid can be preloaded into the V-groove region of the splice element for improved optical connectivity within the splice element. In another aspect, no index matching fluid is utilized. For example, the element 142 can have a length of about 0.3 to 0.4 inches (preferably about 0.350 in.), a height of about 0.1 to 0.2 inches (preferably about 0.13 in.), and a width (when compressed) of about 0.03 to 0.04 inches (preferably about 0.035 in.) for utilization with an LC connector housing.

Splice element 142 is mountable in a mounting device or cradle located in portion 123 of collar body 120. In an exemplary embodiment, the cradle is integrally formed in collar body 120, e.g., by molding. Cradle 124 can secure (through e.g., snug or snap-fit) the axial and lateral position of the splice device 140. For example, one or more retainer elements 129 (see FIG. 6), such as overhang tabs, can be used to secure the element 142 in axial and/or height position prior to actuation of the cap. In this manner, the splice device 140 cannot be rotated, or easily moved forward or backward once installed.

In an exemplary embodiment, in operation, as the cap 144 is moved from an open position to a closed position (e.g. in the direction of arrow 145 depicted in FIG. 2), one or more cam bars located on an interior portion of the cap 144 can slide over splice element legs, urging them toward one another. Two fiber ends, (e.g., one end of fiber 134 and one end of the field fiber 184) are held in place in grooves formed in the splice element and butted against each other and are spliced together in a channel to provide sufficient optical connection, as the element legs are moved toward one another.

Similar, albeit larger, splice elements are described in U.S. Pat. No. 5,159,653, incorporated herein by reference in its entirety. Other conventional mechanical splice devices can also be utilized in accordance with alternative aspects of the present invention and are described in U.S. Pat. Nos. 4,824,197; 5,102,212; 5,138,681; and 5,155,787, each of which is incorporated by reference herein, in their entirety.

Mechanical splice 140 allows a field technician to splice the second end of fiber stub 134 to a field optical fiber 184 at a field installation location. The term "splice," as utilized herein, should not be construed in a limiting sense since splice 140 can allow removal of a fiber. For example, the element can be "re-opened" after initial actuation, as slots may be formed in the collar body to permit entry of a tool that moves cap 144 from an actuated position within the cradle to a non-actuated position. This configuration permits repositioning of the spliced fibers, followed by replacement of the cap to the actuating position.

Further, collar body 120 includes a buffer clamping portion 126 that can be configured to clamp the buffer portion of the field fiber 184 being spliced. In an exemplary aspect, the buffer clamping portion 126 is disposed within the interior of the clip 116 in the fully assembled connector. In a preferred aspect, buffer clamping portion 126 is an integral part of the connector structure. For example, FIG. 6 shows buffer clamping portion 126 one or more longitudinally formed slots, resulting in a collet-like shape. This configuration creates clamping fingers 128 to depress and engage the buffer portion of a field fiber 184 when a sleeve 160 is slidingly fitted over buffer clamp 126 by moving sleeve 160 on an axial direction towards the connector housing. Other alternative buffer clamps structures can also be utilized, such as described in US Publication No. 2007/0104425 A1, incorporated by reference herein.

In a further alternative aspect, connector 100 can include a collar body having a flexible mounting portion for the ferrule, such as is described in U.S. Patent Application No. 61/171,908, incorporated by reference herein in its entirety.

In an exemplary aspect, connector 100 further includes a trigger portion 130. The trigger portion 130 is positioned between the boot 180 and the clip 116. In one aspect, trigger portion 130 has an opening to pass over clip portion 118 (see FIG. 7). Trigger portion 130 has a front face portion 133 with a recess designed to engage a corresponding boss 114 formed on an outer surface of a rearward portion of clip 116. Also, trigger portion 130 has a rear face portion 139 with a recess designed to engage a corresponding front face portion 181 formed on an outer surface of boot 180. This structure can reduce the impact of side loads applied to the boot.

Trigger 130 further includes a frontward extending latch 135 (i.e., it extends toward the front face 102 of the housing) that is configured to engage housing latch 115 when the latch trigger 135 is activated by a modest pressing force. Due to the small format size of an LC connector and its corresponding receptacle, and also the tight space requirements of devices having LC receptacles, it can be difficult to directly access latch 115 to releases the LC connector. Accordingly, the trigger latch 135 provides a straightforward access point for a user to release the LC connector. For example, as is shown in FIG. 3, a lower surface portion of trigger 135 can contact an upper surface portion 114A of housing trigger 115 when the trigger latch 135 is pressed. A ridge or similar structure can be placed on the upper surface of trigger latch 135 to provide a grip feature to assist in removal of a connector mounted in a receptacle.

Trigger 130 can be formed from a material similar to that comprising shell 112, or a more flexible or pliant material, such as a nylon material. In one exemplary aspect, the trigger material is more pliant than the shell material, as it can withstand pressing forces applied over multiple times.

Trigger 130 is also structured so that connector 100 can be coupled to another LC connector in a straightforward manner in a duplex format. Conventional LC format connectors often require an additional separate piece part (such as a holder) to form an LC duplex set of connectors. In contrast, in an exemplary aspect shown in FIG. 5, the trigger 130 includes an integral coupling mechanism to couple a first LC connector to a second LC connector. Moreover, in another alternative aspect, multiple connector sets are not just limited to a duplex configuration. For example, given the above design, more than two connectors can be coupled together in a straightforward manner (e.g., as a three-, four-, ten-, etc. connector set), depending on the application.

Figure 4:
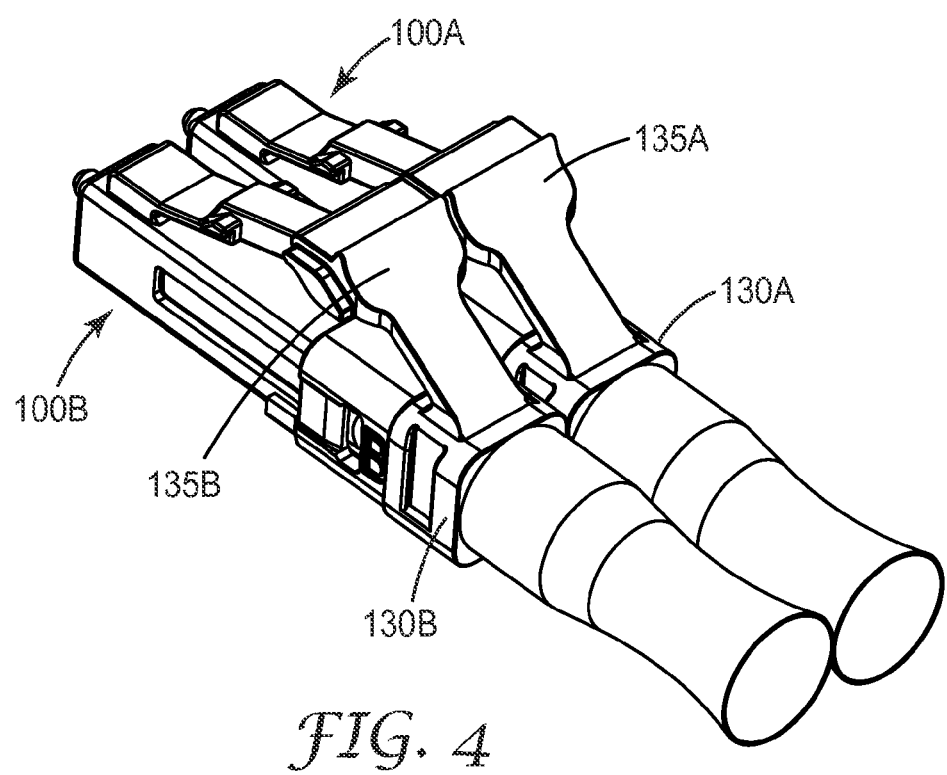
FIG. 4 is an isometric view of an exemplary duplex connector according to another embodiment of the present invention.
Figure 5:
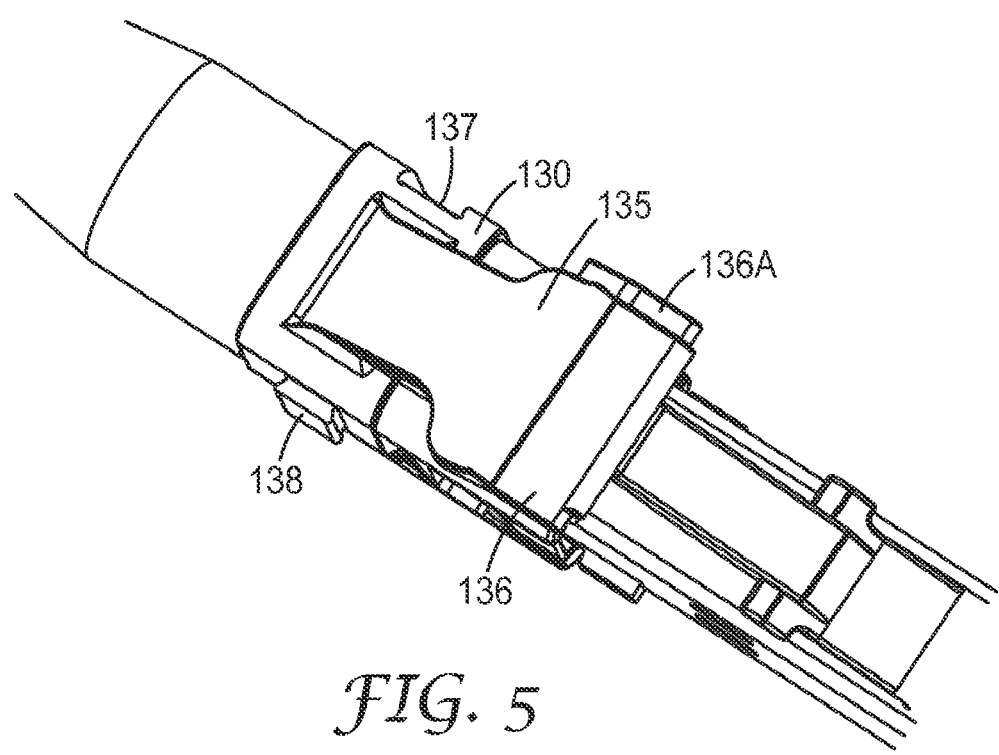
FIG. 5 is a top view of an exemplary trigger portion of an optical connector according to an embodiment of the present invention.

In this aspect, the coupling mechanism comprises a dovetail protrusion 138 formed on a first side surface of trigger 130 and a corresponding slot 137 formed on an opposite side surface of trigger 130, where the slot 137 is configured to slidingly and snugly engage a dovetail portion of the trigger of another connector. For example, as is shown in FIG. 4, a duplex connector 100A/100B includes a first LC 135A coupled to a second LC 135B. This coupling mechanism can establish the correct separation distance between the mated connectors of the duplex. Other coupling integral mechanisms, such as a ball and socket mechanism, or a tongue and groove mechanism, can also be utilized. In addition, for convenience of use in the field, each clip 116 can include cable identification labels 117 (see FIG. 7) formed on opposite outer sides, such as an "A" on one side and a "B" on the other side (or a "1" and a "2", etc.).

Further, trigger latch 135 includes a cap or driver surface 136 that can be easily contacted by a user's thumb or other finger to depress the latch. Moreover, as is shown in FIG. 1, the cap surface 136 can include an underhanging lip portion 136A (extending from one side of the cap 136) and an overhanging lip portion 136B (extending from an opposite side of the cap 136). These extensions are configured to engage the cap of another trigger when utilized in a duplex format. For example, as is shown in FIG. 4, the underhanging lip portion of the trigger 130A of connector 100A is disposed directly beneath the overhanging lip portion of the trigger 130B of connector 100B. Thus, the user can depress the cap portion of trigger latch 135B and also engage the cap portion of trigger latch 135A to depress the corresponding housing latches of both connectors of the duplex.

To prevent sharp fiber bends at the connector/fiber interface, a boot 180 can be utilized. The boot 180 is coupled to the back end of connector 100. As mentioned above, the boot includes a front face portion 181 formed on an outer surface of boot 180 to engage between a rear face portion 139 of trigger 130 and the rear portion 118 of the clip 116 (see e.g., FIG. 3). In an exemplary aspect, boot 180 includes a flare-shaped tail 182 to provide sufficient performance when using a variety of fiber types for field fiber 184 (e.g., 250 μm or 900 μm fibers). This type of boot can be pre-installed in the factory (i.e., fitted onto the connector prior to the field fiber termination). Alternatively, another boot shape can be utilized. Other boot configurations are described in US Publication No. 2007/0104425 A1, incorporated by reference herein.

Figure 8:
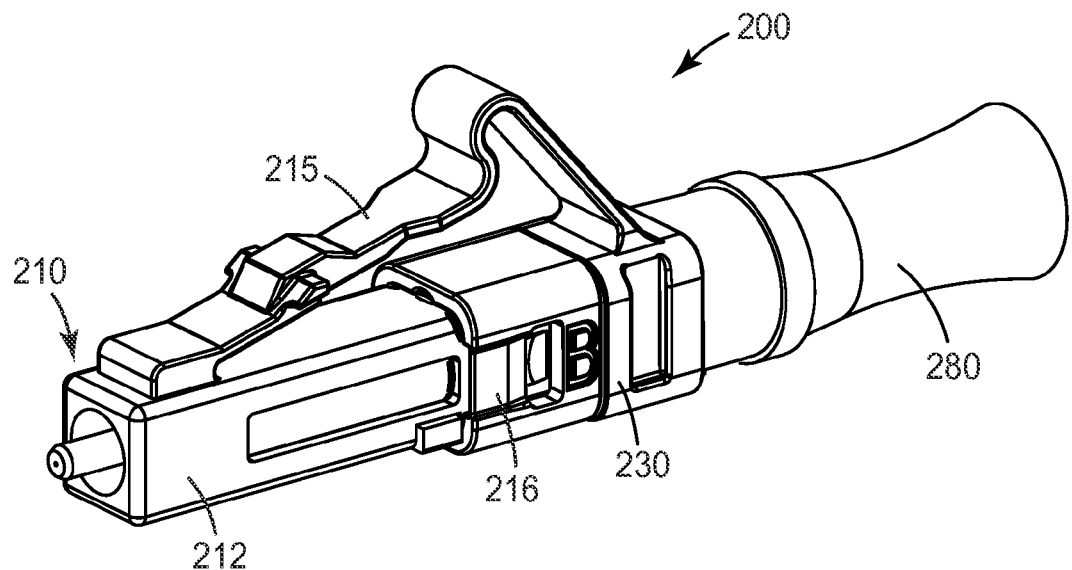
FIGS. 8 and 9 are isometric views of an alternative optical connector according to another embodiment of the present invention.
Figure 9:
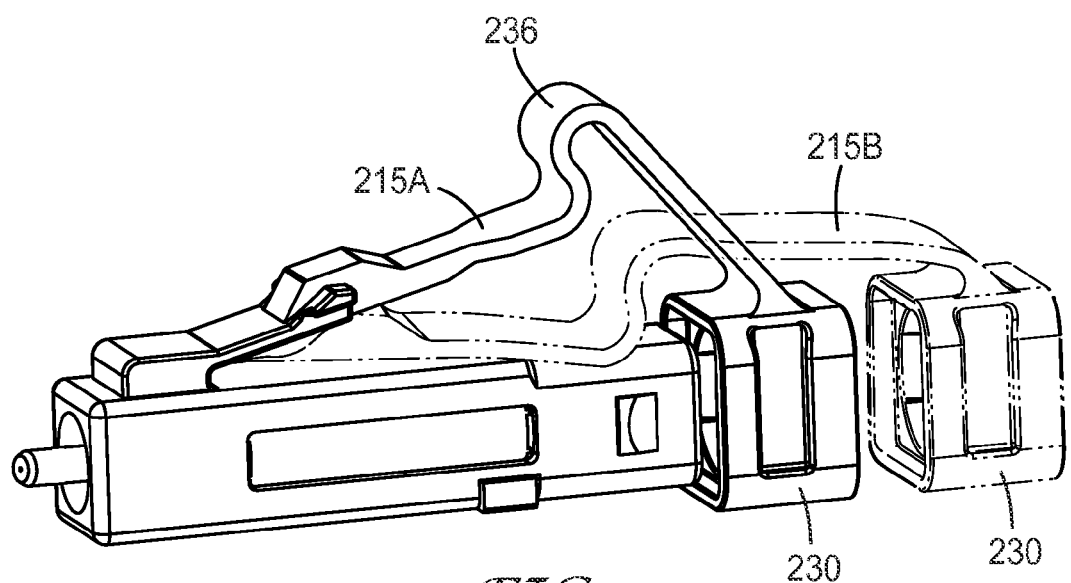

In an alternative aspect, as is shown in FIGS. 8 and 9, the connector latch can have one-piece configuration. For example, FIG. 8 shows an LC connector 200 that includes a housing 210 having an outer shell 212 configured to be received in an LC format receptacle. A clip 216, similar to that described above, can be provided as a backbone support structure for the connector 200. A trigger 230 is also provided to help further couple the boot 280 to the clip 216. In this alternative configuration, latch 215 is a single, contiguous latch that couples the housing outer shell to the clip. This alternative structure creates a continuous beam member that flexes or bows in the central region of the connector. As shown in FIG. 9, at a pre-installed position 215B, the latch is flattened as the clip 230 is displaced away from the front of the connector. In the installed position 215A, the latch includes a raised surface 236 that is depressable by a user's finger in a straightforward manner. This alternative configuration ensures that the trigger and latch are always in contact and it can reduce potential snagging occurrences.

Figure 11A:
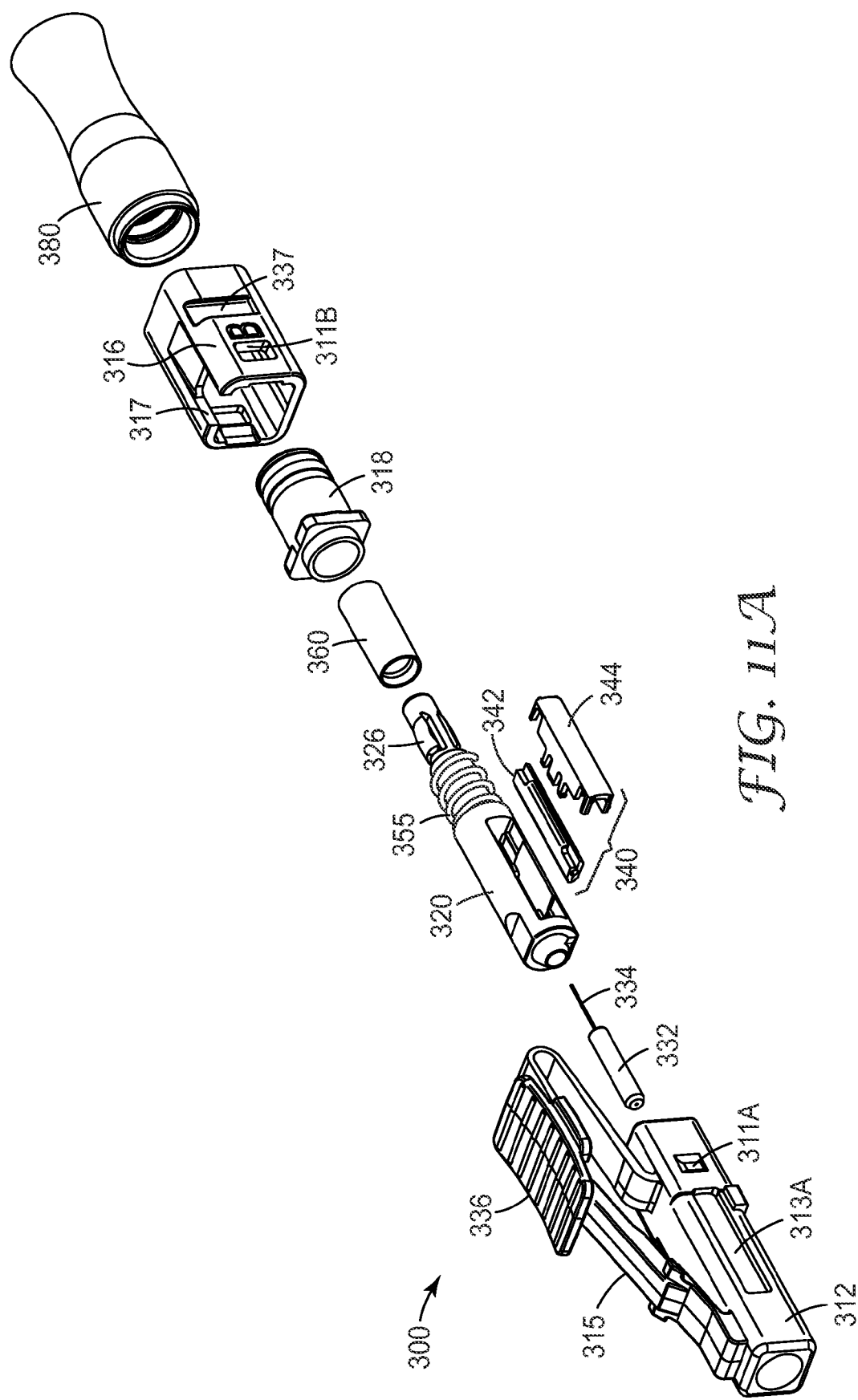
FIG. 11A is an exploded view of an optical connector according to another embodiment of the present invention.
Figure 11B:
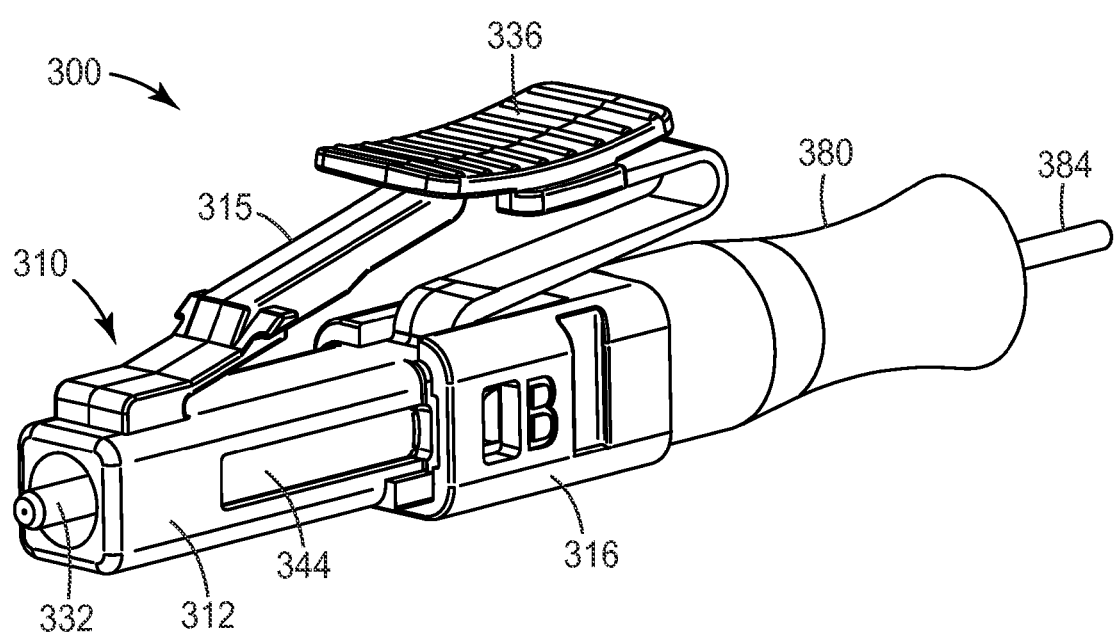
FIG. 11B is an isometric view of the optical connector of FIG. 11A.

In yet a further alternative embodiment, the connector latch can have one-piece configuration as is shown in FIGS. 11A and 11B. For example, FIGS. 11A and 11B show an LC connector 300. The connector housing 310 includes an outer shell 312 configured to be received in an LC format receptacle and a clip 316 that can be provided as a backbone support structure for the housing. Clip or backbone 316 can further include a robust mounting structure 318 disposed on a rear portion of the clip that provides for coupling to a crimp ring, a fastener, or a fiber boot 380, which can be utilized to protect the optical fiber from bend related stress losses. Fiber boot 380 is coupled to the mounting structure 318 disposed on the rear portion of the clip 316.

In this alternative embodiment, a separate trigger component is omitted. In this alternative configuration, latch 315 is a single, contiguous latch that is formed on the outer shell 312 structure. In particular, the latch 315 is connected to the outer shell 312 at both the front end (near the ferrule tip as shown in FIG. 11B) and rear end (near the clip 316). The latch 315 further includes a driver surface 336, preferably formed as a large pad disposed near the rear end of the outer shell 312, that can be easily contacted by a user's thumb or other finger to depress the latch for removal of the connector 300 from a receptacle (e.g., an LC adapter/coupling (not shown)). Clip 316 includes a slot 317 that allows the clip 316 to be slid over the rear portion of the outer shell 312 and that accommodates the latch 315. Clip 316 can be fastened to outer shell 312 via a snap fit mechanism 311A, 311B. Also, in this alternative aspect, clip 316 can include a coupling mechanism to couple connector 300 to another connector in a duplex or other multi-connector format. In a preferred aspect, the coupling mechanism comprises a dovetail protrusion formed on a first side surface of the clip 316 (not shown) and a corresponding slot 337 formed on an opposite side surface of clip 316. Slot 337 is configured to slidingly and snugly engage a dovetail portion of an adjacent connector.

In addition, for convenience of use in the field, the clip 316 can include cable identification labels formed on opposite outer sides, such as an "A" on one side and a "B" on the other side (or a "1" and a "2", etc.).

Connector 300 further includes a collar body 320 that is disposed within the connector housing and retained therein. According to exemplary embodiments, the collar body 320 is a multi-purpose element that can house a fiber stub assembly, a mechanical splice 340, and a fiber buffer clamp 326, which can be activated by a buffer clamp sleeve 360. The collar body 320 can be configured the same as or similar to collar body 120 described in detail above. Further, collar body 320 can be formed or molded from a polymer material, although metal and other suitable materials can also be utilized, as is described above. The collar body 320 is secured within housing 310 by clip portion 316, in a manner similar to that described above. The collar body 320 also accommodates a spring 355 that engages a shoulder portion formed on the interior surface of clip 316.

Collar body 320 further accommodates a mechanical splice 340 that is configured the same as or similar to splice 140 described above. In an exemplary embodiment, splice 340 comprises a mechanical splice device, having a splice element 342 and an actuating cap 344, that is configured to be smaller than the conventional mechanical fiber optic splice device, owing to the reduced form factor of the LC connector (as compared, e.g., to a conventional SC connector format).

In particular, collar body 320 includes a first end portion having an opening 313A to receive and house a fiber stub assembly, which includes a ferrule 332 having an optical fiber 334 secured therein. Ferrule 332 can be formed from a ceramic, glass, plastic, or metal material to support the optical fiber 334 inserted and secured therein in a manner the same as or similar to ferrule 132 described above. A second end of the fiber 334 extends part-way into the interior of the connector 300 and is utilized to splice a second optical fiber, such as field fiber 384 (see FIG. 11B). This alternative configuration reduces the likelihood that the latch will be inadvertently snagged and provides a more easily accessible latch driver.

In another exemplary aspect, a field termination procedure and field termination platform are provided. The field termination procedure and field termination platform are described with reference to FIG. 10. In this exemplary embodiment, the LC connector body is coupled to a field termination platform 400 that is configured to allow the field technician to perform multiple termination steps in a single, integrated device. The exemplary termination platform can be fitted with one or more fiber guide sections to allow easy and reliable alignment and insertion of the fiber into the connector. The fiber guides can also provide positive positioning of the very small fiber end without the need for visual aids or good lighting conditions. Alternative field termination platform constructions can also be utilized, similar to those described in described in US Publication No. 2007/0104425 A1, incorporated by reference above.

In particular, field termination platform or tool 400 provides for repeatable, accurate fiber insertion in the optical connector and applies the correct bow length/force regardless of the fiber type. Moreover, the field termination platform of this embodiment allows the field technician to utilize a fully assembled connector during termination. The field termination platform of this alternative embodiment can be made inexpensively to provide a low cost tool to the customer.

Figure 10:
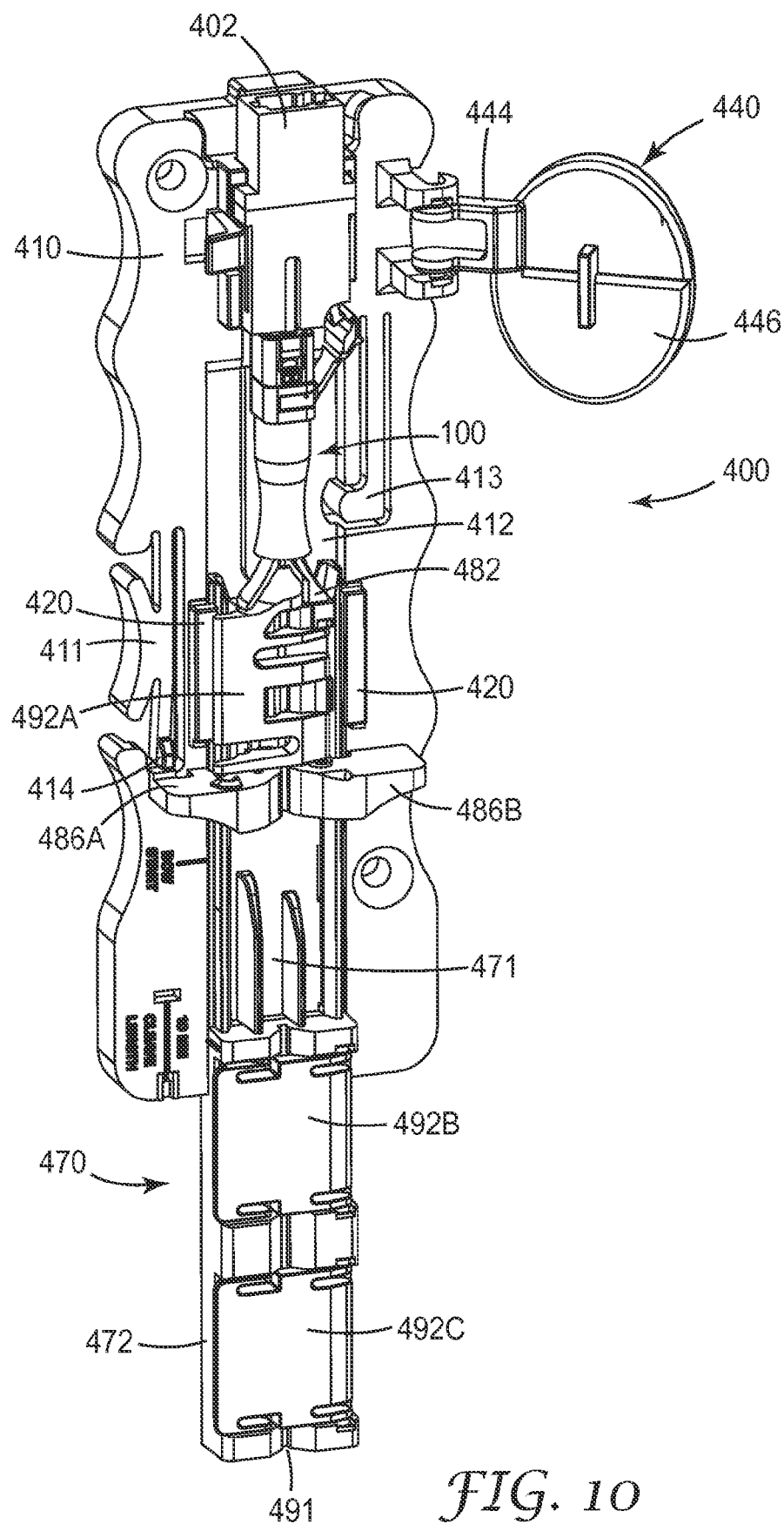
FIG. 10 is an isometric view of an exemplary field termination platform according to another embodiment of the present invention.

Platform 400 includes a base portion 410 having a guide channel 412, a drag finger 413 and a stop release lever 411 formed therein. Platform 400 further includes a connector mount or holder 402 that is configured to receive and secure an LC format optical connector, such as LC connector 100 during the fiber termination procedure. As shown in FIG. 10, connector 100 is shown disposed on its side so that sufficient access to the mechanical splice mechanism is provided.

The connector holder 402 may be attached to the platform by a mechanical fastener, such as screws or snap catches. Alternatively, the connector holder 402 may be connected to the platform by an adhesive or other bonding technique, such as welding. The connector holder 402 can be preferentially attached to the base portion 410 by a releasable fastener to allow for connector holder replacement when a different connector format is used.

Platform 400 can further include an actuation mechanism 440 that includes a cap actuator or driver 446 that is configured to contact and press against the splice cap of the connector, such as splice cap 144 of the mechanical splice 140. For example, a pressing movement can be applied to cap actuator or driver 446 to displace the driver towards the cap until contact is made to actuate the mechanical splice. In this exemplary embodiment, the driver 446 can be coupled to base 410 via levers 444. In addition, levers 444 can be configured to engage a side of base 410.

In addition, platform 400 includes a fiber holder assembly 470 that includes a fiber holder assembly base 472. In a preferred aspect of this embodiment, the fiber holder assembly base 472 is configured to be slidably received in channel 412 of the platform base 410. In addition, the fiber holder assembly base 472 further includes its own channel or slot 471 formed therein. According to an exemplary aspect of this embodiment, platform base 410, fiber holder assembly 470, and components thereof, can be formed or molded from a polymer material.

Fiber holder assembly 470 includes a buffer clamp actuator and fiber holder portions 492A, 492B, and 492C. The fiber holder portions are provided to support and temporarily secure an optical fiber during the termination process. The fiber holder portion can each include one or more aligned fiber guides or channels to provide more axial support of the fiber along a substantial distance of the platform. For example, fiber guides or channel 491 is shown at the rear portion of the fiber holder assembly.

In this exemplary embodiment, the first fiber holder 492A is formed as part of the buffer clamp actuator, thus as a subassembly of assembly 470 that is slidably received in the slot or channel 471. The buffer clamp actuator can include a funnel-shaped fiber guide (or funnel) 482 that can both guide a fiber and actuate a buffer clamp mechanism of a connector 100 held in mount 402.

The fiber holder assembly base 472 includes a second fiber holder portion 492B and a third fiber holder portion or fiber clamp 492C, each of which are pivotably attached to the fiber holder assembly base 472. In addition, fiber holder portions 492A, B and C can utilize the same or different clamping mechanisms. For example, fiber holder 492A can be snap closed over a fiber when inserted, but the holder cover can float so as to accept different fiber diameters. Fiber holder portion 492B can be closed over the fiber once inserted but is preferably not latched, thus using gravity to retain the fiber. Fiber holder portion 492C can be configured as a fiber clamp that can be snapped closed over a fiber once inserted to securely hold it in the fiber holder assembly.

The base 410 further includes stops 420 that are configured to stop the forward sliding motion of the buffer clamp actuator, for example, by contacting buffer clamp handles or lobes 486A and 486B. Stops 420 can further be configured to slightly overhang channel 412 to help prevent base 472 from rising out of channel 412 during fiber bowing.

Fiber holder assembly base 472 can include further stops that can be configured to engage with stops formed in base 410 and, optionally, be received in and engage with a conventional fiber cleaver. Thus the fiber can be kept in the same tool before and after fiber end preparation.

The buffer clamp actuator is configured to engage or otherwise actuate a buffer clamp sleeve, such as buffer clamp sleeve 160 (see e.g., FIG. 2). For example, the buffer clamp actuator can include funnel-shaped fiber guide 482 having a tip portion configured to contact sleeve 160, or a portion thereof. The funnel-shaped portion provides a guide for a fiber, such as an optical fiber 135 to be inserted therethrough. The buffer clamp actuator can further include handles or lobes 486A and 486B that provide accessible contact points for a user to slide the buffer clamp actuator during fiber termination.

The fiber holder portions can each include at least one fiber guide to guide a fiber to be terminated. For example, fiber holder 492C can be formed as an eccentric clamp, to be used to hold the fiber in a guide during termination when placed in a closed position. Additionally, fiber holder 492C can include a piece of foam or other compliant material attached to the underside thereof to conform to a fiber being clamped therein. In addition, a rear fiber channel 491 can be disposed at an end of the fiber holder assembly base 472 to provide further support. Using this configuration, fibers with differing cover stiffness can be gripped and guided by this platform 400 in a straightforward manner.

As mentioned above, in this alternative embodiment, platform 400 includes a base portion 410 having a drag finger 413 and a stop release lever 411 formed therein. Drag finger 413 can be formed as a protrusion such that when fiber holder assembly base 472 is slidably placed within channel 412, drag finger 413 can engage with or press against the side of fiber holder assembly base 472 to temporarily hold fiber holder assembly base 472 in place, such as to prevent axial movement of the assembly base 472 as a fiber being terminated begins bowing.

Stop release lever 411 can also be formed in base 410 to provide an interlocking feature so that the buffer clamp of the connector, e.g., sleeve 160, is not prematurely actuated by buffer clamp actuator 480. For example, near the end of its track, the buffer clamp actuator subassembly can be prevented from further movement until the stop release lever 411 is activated. In this exemplary embodiment, the stop release lever 411 can be formed as a push mechanism having an arm 414 that engages one of the buffer clamp handles or lobes 486A and 486B until the push mechanism is triggered by the user, thus displacing arm 414 to disengage with the buffer clamp handle or lobe.

In practice, a fiber termination process can utilize the platform 400 to terminate an optical fiber in the field to an LC connector 100 in a straightforward manner. In addition, the field technician can utilize an optical connector that is fully assembled in the factory, such that additional connector assembly is not necessary in the field.

For example, a connector 100 can be installed in LC connector coupling or holder 402, e.g., by a snap fit. In this example, connector 100 can be utilized having a boot 180 pre-mounted on the optical connector. After connector mounting, the splice actuation mechanism 440 can be returned to a pre-activation position just above the splice cap 144.

An optical fiber, such as optical fiber 184, can be prepared by stripping and cleaving (flat or angled) to match the orientation of the pre-installed fiber stub of the optical connector. Optical fiber 184 can be prepared prior to insertion in assembly 470 or after insertion in assembly 470. In one aspect, for fiber end preparation, a portion of the fiber can extend by a suitable amount, for example about 40 mm to 50 mm, beyond the end of the fiber holder assembly. The buffer clamp actuator can be spaced from holder 470 along slot or channel 471 by a suitable amount to provide fiber support during stripping and cleaving. The fiber jacket/plastic coating can be stripped using a conventional mechanical fiber stripper. A small amount of plastic coating can extend beyond the end of assembly 470. The glass portion of the fiber can be wiped clean. Cleaving, using a conventional cleaver, such as described above, can be performed as the fiber is held in place in the fiber clamp assembly.

Prior to actuation, the buffer clamp actuator 480 can be positioned at the front end of the fiber holder assembly 470. The optical fiber being terminated, such as fiber 184, can be installed in the fiber holder assembly by laying the fiber in funnel portion 482 of the buffer clamp actuator and on top of the fiber guides. The fiber 184 can be held in place by engaging fiber holder portions 492A, B and C and placing one or more of the fiber holder portions in a closed position. The fiber holder portions can be configured to clamp a standard optical fiber outer jacket, such as a conventional fiber having 900 µm buffer sleeve or a 250 µm buffer sleeve.

The fiber can then be pulled back along the length of the fiber holder assembly such that the prepared end of the fiber is flush with the tip of the funnel 482. The positioning can protect the prepared fiber end during this portion of the termination procedure. In addition, this positioning allows initial insertion of the fiber end into the connector back end without having to visually locate the fiber tip, as the tip of the buffer clamp actuator can be used as a visual proxy.

The fiber holder assembly 470, with the prepared fiber held therein, can be inserted in channel 412 of the platform base 410. The fiber holder assembly can be moved forward (i.e., towards the mounted connector) by applying modest force to holder assembly base 472. The base 472 and buffer clamp actuator move together along channel 412 until the stop release lever 411, e.g., arm 414, is engaged by at least one of the handles or lobes 486A and 486B. This engagement of the buffer clamp actuator stops the funnel tip from further movement until the stop release lever 411 is disengaged by the user, as is described above. The fiber assembly 472 can continue to be slid in channel 412.

As the assembly 472 is slid further forward, and as the prepared fiber end begins to contact the fiber stub 134 in the mechanical splice of the connector body, the first fiber holder portion 492A can engage with cams formed in the assembly base 472. As the cams continue to move relative to the stationary buffer clamp subassembly, a first cam can begin to lift fiber holder portion 492A. After further axial movement of base 472, the second cam can lift the fiber holding portion 492A even further.

The gradual and automatic lifting of the fiber holder portion 492A allows the fiber 184 to bend or bow as the prepared end contacts the fiber stub without further axial displacement of the fiber. In addition, the cover of the second fiber holding portion 492B can also be designed to lift to accommodate for fiber bowing, such as can occur when using optical fibers of a particular stiffness. Further, the drag finger 413 can prevent the base 472 from sliding away from the connector mount as the fiber end contacts the fiber stub.

The cap actuator or driver 446 can then be pressed against the splice cap of the connector, such as splice cap 144, to actuate the mechanical splice in connector 100.

The stop release button 411 can then be pressed to release arm 414 from engaging at least one of handles or lobes 486A and 486B and to allow the buffer clamp actuator 480, especially tip portion to move further forward toward the connector. The funnel tip can be pushed fully forward to actuate the buffer clamp sleeve 160 of connector 100.

Upon buffer clamp actuation, the terminated connector is complete. The fiber clamp 492C can be returned to the open position, releasing the fiber bow and the LC connector 100 can be removed from the LC coupling 402.

Thus, as is understood in view of the description above, the platform of the alternative embodiment can accommodate a wider range of fibers and fiber stiffness, such as 250 µm coating, 900 µm soft PVC coating, 900 µm rigid nylon coating, etc. This platform maintains an acceptable axial force on fiber-tip. The force should be high enough so the fiber is inserted into the connector splice region, yet does not have excess force which can damage fiber tip. The tool can allow for suitable insertion of the fiber into the tool and straightforward release of the assembled LC connector from the tool.

Optionally, the mount or coupling 402 can be further configured to couple a detector or light source to test the quality of the terminated LC connector. Further, a user can set up a light source detector system to monitor signal loss during termination. The actuation driver can be raised and the terminated connector can then be removed from mount or coupling 402. The connector can then be utilized as desired by the user.

Thus, according to this alternative embodiment, a complete tool or platform can be provided to allow field termination of an optical fiber in an LC connector without the need to perform field polishing or use epoxies. In addition, the tool or platform is reusable. Using this configuration, even fibers with high bending (due to spooling) can be gripped and guided by this platform in a straightforward manner. The connector can be pre-assembled in the factory, even with a pre assembled boot. The buffer clamp actuator mechanism can also be utilized to protect the fiber during initial insertion into the LC connector.

The LC connector described above can be used in many conventional optical connector applications. The optical connectors described above can also be utilized for termination (connectorization) of optical fibers for interconnection and cross connection in optical fiber networks inside a fiber distribution unit at an equipment room or a wall mount patch panel, inside pedestals, cross connect cabinets or closures or inside outlets in premises for optical fiber structured cabling applications. The optical connectors described above can also be used in termination of optical fiber in optical equipment. In addition, one or more of the optical connectors described above can be utilized in alternative applications.

As mentioned above, the LC connector of the exemplary embodiments is of compact length and is capable of straightforward field termination with reduced assembly times. Such exemplary connectors can be readily installed and utilized for FTTP and/or FTTX network installations, such as part of a fiber distribution unit.

The LC connector design can further provide for more compact configurations in other outside plant applications, such as pedestals, closures, terminals, and fiber NIDS, to name a few.

Various modifications, equivalent processes, as well as numerous structures to which the present invention may be applicable will be readily apparent to those of skill in the art to which the present invention is directed upon review of the present specification.

We claim:

1. An LC format optical connector for terminating an optical fiber, comprising:
   a housing configured to mate with an LC receptacle, the housing including a shell having an LC format and a front face, a first resilient latch disposed on a surface of the shell and configured to engage the LC receptacle, the first resilient latch extending away from the front face, and a backbone configured to engage an outer surface of the shell on a first portion thereof and having a mounting structure disposed on a second portion thereof;

a collar body disposed in the housing and retained between the outer shell and the backbone, wherein the collar body includes a fiber stub disposed in a first portion of the collar body, the fiber stub including a first optical fiber mounted in a ferrule and having a first end proximate to an end face of the ferrule and a second end, wherein the collar body further includes a mechanical splice disposed in a second portion of the collar body, the mechanical splice configured to splice the second end of the fiber stub to a second optical fiber; and a trigger coupled to an outer surface of the backbone, the trigger including a second latch that extends toward the front face, wherein a portion of the second latch overlaps a portion of the first latch, wherein the second latch engages the first latch when acted upon by a pressing force, wherein the trigger further comprises an integral coupling mechanism to couple the LC format optical connector to a second LC format optical connector, wherein the coupling mechanism comprises a dovetail protrusion formed on a first side surface of the trigger and a corresponding slot formed on an opposite side surface of the trigger, wherein the slot is configured to slidingly and snugly engage a dovetail portion of the trigger of the second LC format optical connector.

2. The LC format optical connector of claim 1, further comprising:
a fiber boot coupled to an end of the housing to restrict a lateral motion of the second optical fiber, the fiber boot having a first portion thereof disposed between the backbone and the trigger.

3. The LC format optical connector of claim 1, further comprising cable identification labels formed on opposite outer sides of the backbone.

4. The LC format optical connector of claim 1, wherein the second latch includes a driver that overlaps a portion of the first latch, the driver configured to receive a pressing force from a finger.

5. The LC format optical connector of claim 4, wherein the driver of the trigger latch includes an underhanging lip portion extending from a first side of the driver and an overhanging lip portion extending from an opposite side of the driver.

6. The LC format optical connector of claim 1, further comprising:
a buffer clamp configured within a third portion of the collar body, the buffer clamp configured to clamp at least a portion of a buffer cladding of the second fiber upon actuation; and
a buffer clamp actuation sleeve configured to be received on an outer surface of the third portion of the collar body and configured to slidably actuate the buffer clamp.

7. The LC format optical connector of claim 1, wherein the first latch and the second latch are formed as a single, integral latch structure.

8. A multiple set LC format optical connector, wherein the multiple set LC format optical connector includes the LC format optical connector of claim 1 and at least a second LC format connector, the second LC format optical connector having a second housing, a second collar body and a second trigger, wherein the second trigger includes a second coupling mechanism that includes a dovetail protrusion and a corresponding slot, wherein the dovetail protrusion of the second LC connector engages the corresponding slot of the LC format optical connector of claim 1.

9. The multiple set LC format optical connector of claim 8, wherein the multiple set LC format optical connector is a duplex LC format optical connector.

10. An LC format optical connector for terminating an optical fiber, comprising:
a housing including an outer shell configured to mate with an LC receptacle, the outer shell having an LC format and a front face, the housing further including a resilient latch disposed on a surface of the outer shell and configured to engage the LC receptacle, wherein the resilient latch comprises a single-piece latch having a driver formed thereon that is configured to receive a pressing force that disengages the latch from an LC receptacle, the housing further including a backbone configured to engage an outer surface of the outer shell on a first portion thereof and having a mounting structure disposed on a second portion thereof configured to engage a boot; and a collar body disposed in the housing and retained between the outer shell and the backbone, wherein the collar body includes a fiber stub disposed in a first portion of the collar body, the fiber stub including a first optical fiber mounted in a ferrule and having a first end proximate to an end face of the ferrule and a second end, wherein the collar body further includes a mechanical splice disposed in a second portion of the collar body, the mechanical splice configured to splice the second end of the fiber stub to a second optical fiber, wherein a first portion of the latch is connected to the outer shell near the front face and a second portion of the latch is connected to the outer shell near an opposite end of the outer shell, and wherein the backbone further includes a slot configured to permit the backbone to be slid over a portion of the outer shell and that accommodates the second portion of the latch.

11. The LC format optical connector of claim 10, wherein the backbone further comprises an integral coupling mechanism to couple the LC format optical connector to a second LC format optical connector in a multiple connector format.

12. The LC format optical connector of claim 11, wherein the coupling mechanism comprises a dovetail protrusion formed on a first side surface of the backbone and a corresponding slot formed on an opposite side surface of the backbone, wherein the slot is configured to slidingly and snugly engage a dovetail portion of the trigger of the second LC format optical connector.

13. The LC format optical connector of claim 11, wherein the backbone includes cable identification labels formed on opposite outer sides thereof 14. The LC format optical connector of claim 11, wherein the coupling mechanism comprises one of a ball and socket mechanism and a tongue and groove mechanism.

15. The LC format optical connector of claim 11, further comprising an opening formed on a side of the outer shell of a size to provide for access to the mechanical splice when the outer shell is mounted over the collar body.

16. A duplex LC format optical connector comprising the LC format optical connector of claim 11 and at least a second LC format connector coupled together via the coupling mechanism of the LC format optical connector of claim 11 and a second coupling mechanism integrally formed on the second LC format optical connector.

* * * * *